United States Patent
Doganata et al.

(10) Patent No.: US 9,740,478 B2
(45) Date of Patent: *Aug. 22, 2017

(54) IDENTIFYING CAUSE OF INCIDENTS IN THE DEVOPS ENVIRONMENT AUTOMATICALLY

(71) Applicant: International Business Machines Corporation, Armonk, NY (US)

(72) Inventors: Yurdaer N. Doganata, Chestnut Ridge, NY (US); James L. Jones, Austin, TX (US); David L. Leigh, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,667

(22) Filed: Sep. 30, 2015

(65) Prior Publication Data

US 2016/0350203 A1     Dec. 1, 2016

Related U.S. Application Data

(63) Continuation of application No. 14/722,405, filed on May 27, 2015.

(51) Int. Cl.
| | | |
|---|---|---|
| *G06F 9/44* | (2006.01) | |
| *G06F 9/445* | (2006.01) | |
| *G06F 11/36* | (2006.01) | |

(52) U.S. Cl.
CPC .............. *G06F 8/70* (2013.01); *G06F 8/60* (2013.01); *G06F 8/71* (2013.01); *G06F 11/368* (2013.01); *G06F 11/3692* (2013.01)

(58) Field of Classification Search
None
See application file for complete search history.

(56) References Cited

U.S. PATENT DOCUMENTS

| | | |
|---|---|---|
| 6,219,805 B1 | 4/2001 | Jones et al. |
| 2008/0126162 A1* | 5/2008 | Angus ............... G06Q 10/0631 705/7.12 |

(Continued)

OTHER PUBLICATIONS

C.W.J. Granger "Some recent development in a concept of causality," Journal of Econometrics, vol. 39, issues 1-2, pp. 199-211 (Sep.-Oct. 1988).

(Continued)

*Primary Examiner* — Qamrun Nahar
(74) *Attorney, Agent, or Firm* — Rabin Bhattacharya; Michael J. Chang, LLC (57) ABSTRACT

In one aspect, a method for identifying software development teams causing operation incidents when changing and deploying code is provided. The method includes the steps of: collecting data regarding i) a number of deployed change requests for each of the software development teams and ii) a total number of incident reports; generating a time series for the number of deployed change requests for each of the software development teams and a time series for the total number of incident reports created; performing causality testing between the time series for the number of deployed change requests for each of the software development teams and the time series for the total number of incident reports created; and determining whether the total number of incident reports created can be expressed in terms of the number of deployed change requests for any of the software teams.

15 Claims, 4 Drawing Sheets

(56) References Cited

U.S. PATENT DOCUMENTS

2008/0215546 A1 9/2008 Baum et al.
2010/0023919 A1 1/2010 Chaar et al.
2015/0082281 A1 3/2015 Koenig et al.

OTHER PUBLICATIONS

List of IBM Patents or Applications Treated as Related, Sep. 1, 2016, p. 2.

* cited by examiner

| Period | p-value for $Y = f(X)$ | p-value for $X = f(Y)$ |
|---|---|---|
| June 2014 – October 2014 | 0.80 | 0.083 |
| August 2014 – December 2014 | 0.95 | 0.38 |
| October 2014 – January 2015 | 0.005 | 0.74 |

IDENTIFYING CAUSE OF INCIDENTS IN THE DEVOPS ENVIRONMENT AUTOMATICALLY

CROSS-REFERENCE TO RELATED APPLICATION(S)

This application is a continuation of U.S. application Ser. No. 14/722,405 filed on May 27, 2015, the disclosure of which is incorporated by reference herein.

FIELD OF THE INVENTION

The present invention relates to continuous delivery software development pipelines, and more particularly, to techniques for using causality testing between a number of deployed change requests and a number of incident reports to automatically (i.e., without analyzing the contents of incident reports) identify software teams causing incidents in continuous delivery software development pipelines.

BACKGROUND OF THE INVENTION

DevOps pipelines have increased agility in software development and deployment through fully or semi-automated processes in the cloud. In a DevOps cloud-based environment, a lot of different teams work together to develop software code. A DevOps environment brings about some notable challenges. Namely, since teams are constantly developing and deploying code often simultaneously, when errors occur it is a difficult process to ascertain which team(s) is/are causing the errors.

Further, software developers continuously improve the product quality and value by fixing errors and adding new functionality. An important question for teams practicing DevOps is: "Are we getting better at rapidly delivering high-quality code?" Due to the transient nature between development and information technology (IT) operations, determining the impact of code refreshes or error fixes to system performance is a challenge.

One way of correlating the code refreshes to the system performance is to examine incident reports. Incidents may result from errors introduced during development and deployment cycles. In other words, the deployment after the code refreshes can also cause incidents. There are multiple teams submitting code change requests independent of each other. Identifying the development teams that cause system failures helps to understand if the DevOps practices are implemented properly and make improvements in the process. Incidents may also result from external factors which have nothing to do with development and deployment cycles. All incidents in a production system are systematically recorded in the form of incident reports which are analyzed to determine the root causes.

The information available in the incident report, however, may not be sufficient to relate the incidents to a particular team. When incident reports do not have any indication of who caused the incident, alternative techniques are needed to determine the teams responsible for the incidents. Further, it is a time-consuming process to analyze each of the incident reports in detail which in a fast paced development environment can be a detriment.

Thus, techniques for effectively and rapidly assessing the source of errors in a DevOps environment and whether the team(s) responsible for the errors are getting better or worse at delivering changes would be desirable and can be of great value when prioritizing investments in a continuous delivery (CD) pipeline and/or other process improvements.

SUMMARY OF THE INVENTION

The present invention provides techniques for using causality testing between a number of deployed change requests and a number of incident reports to identify software teams causing incidents in continuous delivery software development pipelines. In one aspect of the invention, a method for identifying software development teams causing operation incidents when changing and deploying code is provided. The method includes the steps of: collecting data regarding i) a number of deployed change requests for each of the software development teams and ii) a total number of incident reports created for all of the software development teams; generating a time series for the number of deployed change requests for each of the software development teams; generating a time series for total the number of incident reports created; performing causality testing between the time series for the number of deployed change requests for each of the software development teams and the time series for the total number of incident reports created; and determining whether the total number of incident reports created can be expressed in terms of the number of deployed change requests for any of the software development teams.

In another aspect of the invention, another method for identifying software development teams causing operation incidents when changing and deploying code is provided. The method includes the steps of: collecting data regarding i) a number of deployed change requests for each of the software development teams and ii) a total number of incident reports created for all of the software development teams; generating a time series for the number of deployed change requests for each of the software development teams; generating a time series for the total number of incident reports created; performing Granger causality testing between the time series for the number of deployed change requests for each of the software development teams and the time series for the total number of incident reports created; and determining whether the total number of incident reports created can be expressed in terms of the number of deployed change requests for any of the software development teams, wherein causality is assumed to exist if the total number of incident reports created can be expressed in terms of the number of deployed change requests for any of the software development teams, and wherein no causality is assumed to exist if the total number of incident reports created cannot be expressed in terms of the number of deployed change requests for any of the software development teams.

A more complete understanding of the present invention, as well as further features and advantages of the present invention, will be obtained by reference to the following detailed description and drawings.

DETAILED DESCRIPTION OF PREFERRED EMBODIMENTS

As provided above, managing errors that occur in a continuous delivery (CD) software development pipeline, such as a DevOps cloud-based environment, can be challenging since teams are constantly developing and deploying code (each iteration of which can be the source of errors). While incident reports can shed some light on the process, they may not always identify the source of the errors, and nonetheless are time-consuming to analyze.

Advantageously, techniques are provided herein which can be used to determine automatically—i.e., from the number of incident reports but without analyzing the contents of the incident reports, whether a software development team is improving their ability to deliver changes to the system by testing whether changes from that team are typically causing incidents. Specifically, the present techniques serve to find cause and effect relationship between the code deployment activity in the DevOps pipeline and the incident reports. For instance, in order to deploy code refreshes, the software development teams follow a change request process which involves filing a new change request (e.g., for the code refreshes), having the request reviewed and, if the changes are approved, deploying the code refreshes, etc. Invalid or unauthorized change requests are rejected, while approved change requests are deployed. The present techniques focus on the deployed change requests, or more specifically, on the number of deployed change requests per software development team.

Data is available for the number of deployed change requests for each development team. Data is also available for the number of incident reports created. The present techniques leverage this data to automatically identify the software development teams that cause operation incidents when they change and deploy their code. See, for example, methodology 100 of FIG. 1.

Figure 1:
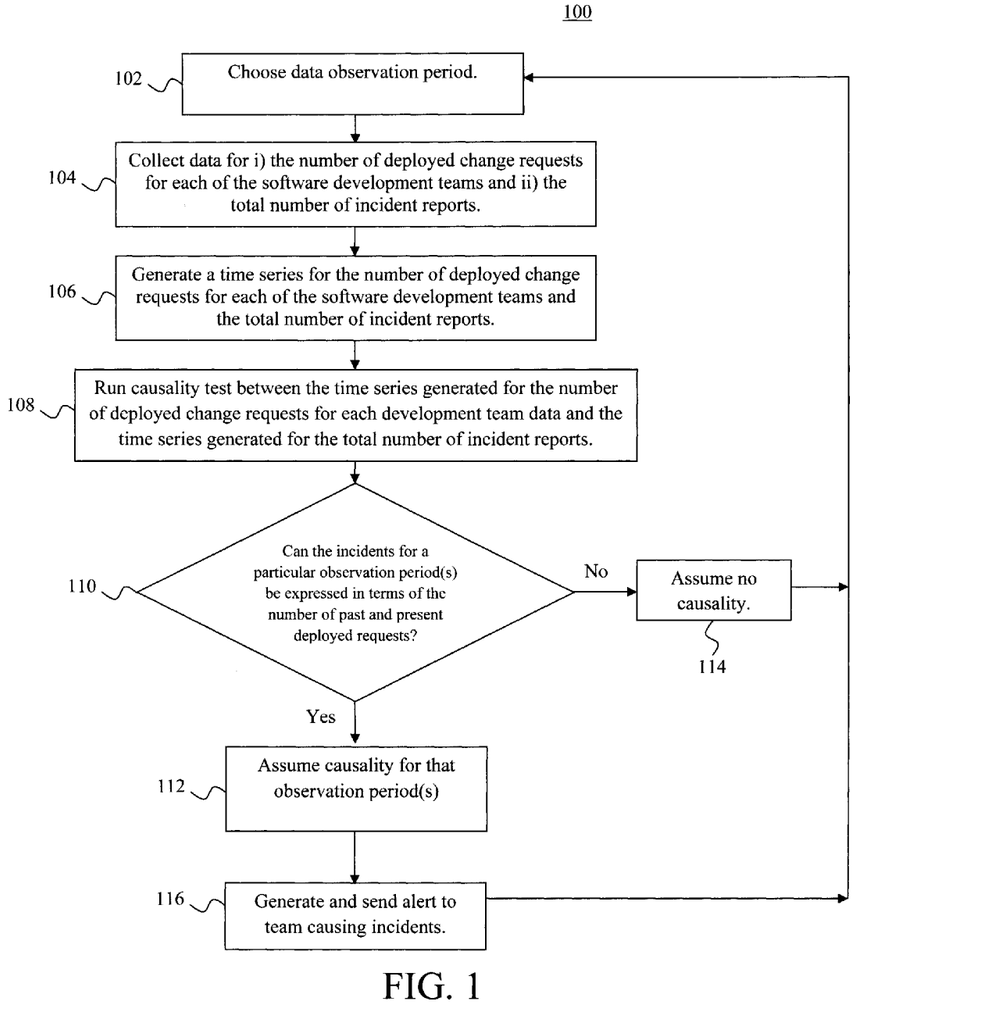
FIG. 1 is a diagram illustrating an exemplary methodology for identifying software development teams that cause operation incidents when changing and deploying code according to an embodiment of the present invention.

In step 102, a data observation period is chosen. By way of example only, a weekly data observation period is employed in the examples provided below (i.e., the number of change requests deployed (per team) and incident reports created each week are observed). Observation periods shorter or longer than a week can, however, be used as long as there is enough data to run the present test on. Namely, causality analysis uses the lag data (e.g., the deployment data from the prior week(s)). The impact of deployment data from weeks lagging is not expected to be high so, for instance, in the example provided below only 10 lagged points were considered. The results showed that only the deployment data from one week prior to the incident matters, that is only 1 lag point matters.

The period for observation chosen in step 102 can be chosen based for example on the workflow of a particular project and can be set at a value that is most meaningful for project managers to assess and address the cause of incidents. For instance, in the case of a rapidly moving project where many teams are working simultaneously and many requests are being deployed each day, one may instead want to observe a period shorter than a week, such as the number of deployments per team and total number of incident reports created (i.e., the total number of incident reports generated for all of the teams) every 2 or 3-day period, or even daily. That way, problems can be addressed before too much time elapses. On the other hand, if a project is less urgent and there are fewer teams working on it, then it stands to reason that fewer change requests will be submitted. In that case, one might gain the best perspective by collecting deployment and incident data over periods longer than a week, such as bi-weekly or even monthly. It is notable that the observation period can vary. For instance, if the project deadline changes and/or the number of teams working on the project changes, then the observation period can also be altered. To use a simple example, if weekly observations of the number of deployments performed and the total number of incident reports created (i.e., the total number of incident reports created for all of the teams) are being employed but the deadline is moved up and/or the number of teams working on the project is increased (for which it is assumed that the number of deployed change requests per team and/or the number of incident reports created will increase), then the project manager might instead wish to have assessments of every 2 or 3 days rather than just every week. On the other hand, if the deadline is moved out and/or the number of teams working on the project is reduced (for which it is assumed that the number of deployed change requests per team and/or the number of incident reports created will decrease), then a better perspective may be gained by looking at these activities over a longer period of time, such as every 2 or 3 weeks, or even on a month-by-month basis.

Figure 2:
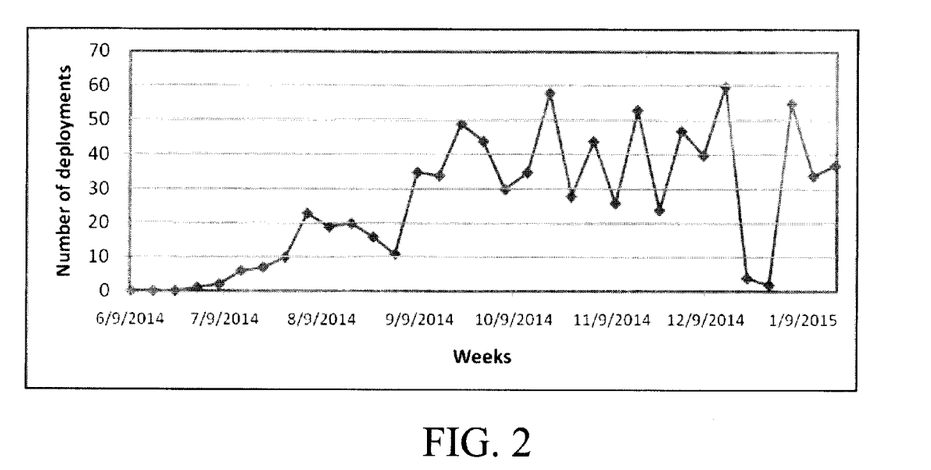
FIG. 2 is a diagram illustrating an example of weekly data collected for the number of deployed change requests for a given software development team according to an embodiment of the present invention.
Figure 3:
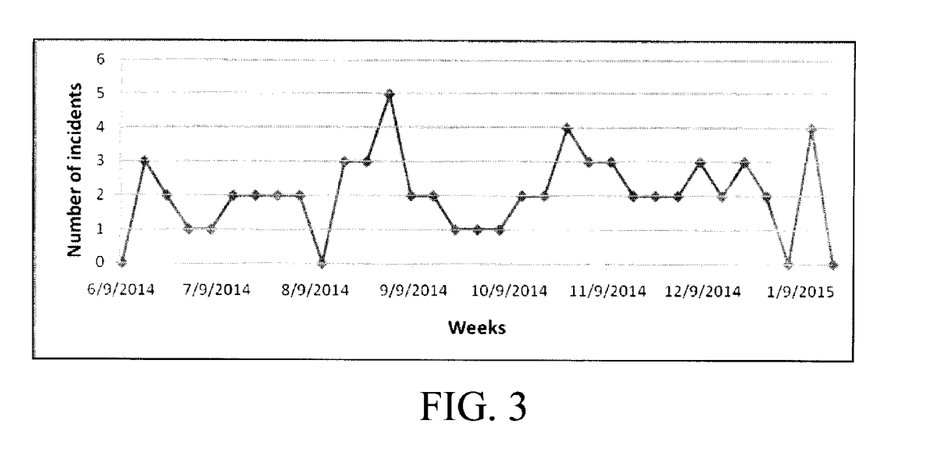
FIG. 3 is a diagram illustrating an example of weekly data collected for the total number of incident reports created (i.e., for one or more teams working on a project) according to an embodiment of the present invention.

In step 104, data regarding i) the number of deployed change requests for each development team (also referred to herein as "deployed requests" or simply "deployments") and ii) the number of incident reports (also referred to herein as "incidents") is collected for the chosen observation period, e.g., the number of deployments per team and the total number of incident reports created each day, each week, etc. According to an exemplary embodiment, methodology 100 is performed to observe the incidents over a plurality of the observation periods (see step 102 above). Thus, for instance, if the observation period chosen in step 102 is weekly observations, then methodology 100 may be performed to analyze the incidents over a, e.g., 5-, 6-, 12-, etc. month period wherein each deployment data point is a weekly number of deployments per team and each incident data point is a weekly total number of incident reports created (i.e., for all of the teams). See, for example, FIGS. 2 and 3, respectively, described below. In the same manner, one might instead choose to look at the daily deployed change requests per team and total incident reports over the 5-, 6-, 12-, etc. month period. See above.

In step 106, time series are generated for the data collected in step 102. Namely, in step 106, a time series is generated for the number of deployed change requests for each development team data (collected in step 104 based on the chosen observation period) and a time series is generated for the total number of incident reports (collected in step 104 based on the chosen observation period). In general, a time series is a sequence of data points (in this case number of a)

deployed (change) requests per team and number of incident reports collected on a, e.g., daily, weekly, bi-weekly, monthly, etc. (see above)) taken over a time interval (e.g., over a 5-, 6-, 12-, etc. month period). For instance, time series data can be sequences of timed stamped records occurring in a continuous stream(s), representing some type of activity made up of discrete events. See U.S. Patent Application Publication Number 2008/0215546 by Baum et al., entitled "Time Series Search Engine."

In step 108, a causality test is then run between the time series generated in step 106. Namely, in step 108 a causality test is run between the time series generated for the number of deployed (change) requests for each development team data and the time series generated for the total number of incident reports. As will be described in detail below, the goal here is to use hypothesis testing to determine whether the time series data of the number of change requests can be used to forecast the total number of incident data, and vice versa. According to an exemplary embodiment, step 108 is performed using Granger causality testing. As is known in the art, Granger causality testing (or GCT) is a statistical hypothesis testing method used to determine whether one time series is useful in forecasting another time series. See, for example, C. W. J. Granger "Some recent developments in a concept of causality," Journal of Econometrics, vol. 39, issues 1-2, pgs. 199-211 (September-October 1988).

Based on the causality testing, a determination is made in step 110 as to whether (or not) the number of incidents at a particular observation period (day, week, month, etc.—see above) can be expressed in terms of the number of past and present deployed (change) requests of a project (i.e., the analysis focuses on incidents at a particular point in time and the impact of deployments that happened in the past and at the time when the incident happened). For instance, by way of example only, if the observation period chosen in step 102 is weekly, then in step 110 it is determined whether the total number of incidents at any particular weekly observation period(s) (e.g., total number of incidents at week 1, total number of incidents at week 2, etc.) can be expressed in terms of the number of past and present deployed requests for a team. If it is determined in step 110 that the total number of incidents at one or more of the observation periods can be expressed in terms of the number of deployed requests, then in step 112 causality is assumed between those incidents and the deployed requests from the corresponding development team during those observation periods. On the other hand, for those observation periods (e.g., those weeks) having incidents that cannot be expressed in terms of the number of deployed requests for a team, then in step 114 no causality is assumed to exist.

Referring back to the case where causality is found to exist (see step 112), in step 116, an alert can be generated and sent to the team or teams responsible for the incidents. These teams can then take actions to address the issue (i.e., to reduce the incidents caused by their deployments). For instance, the teams can evaluate their change request and deployment processes and modify them to reduce the impact on the incidents. Alerted teams may add a review before deployment.

As shown in FIG. 1, the process can be repeated, e.g., at predetermined time intervals. For instance, methodology 100 may be performed once every week, month, 6 months, etc. See example below where three time intervals are employed. Further, as noted above, the observation period does not have to remain static, and in some instances it may be desirable to change (e.g., increase or decrease) the observation period based on the project activity. See above.

Thus, the observation period can be changed for one or more of the time intervals, if so desired.

A detailed description of the time series of data and causality testing aspects of the present techniques is now provided. As highlighted above, in order to evaluate the performance of a deployment team, the present process is used to evaluate whether the code changes committed by a project team are the possible causes of incidents by using, for example, Granger causality test. Granger causality is a statistical hypothesis test to determine if the time series of the change request data can be used to forecast the incident data or vice versa.

The Granger causality test takes two time series into consideration. A time series X is said to Granger-cause another time series if the lagged values of X together with the lagged values of Y provide information to predict the future values of Y. In order to claim Granger-causality, all lagged values of X must be significant according to their t-statistics and add explanatory power to model jointly with other lagged values according to F-test. This is a statistical hypothesis test where the null hypothesis is stated as "there is no causality between X and Y." The null hypothesis is not rejected if no lagged values of X have been retained in the regression as a result of the significance test.

If $y_t$ is a stationary time series for the number of incidents and $x_t$ is the number of deployments at time t, then $y_t$ is expressed as an "augmented auto regression" as follows:

$$y_t = a_0 + a_1 y_{t-1} + a_2 y_{t-2} + \ldots + a_p y_{t-3} + b_1 x_t + \ldots + b_p x_{t-m} + \text{Residual}$$

Here $y_{t-m}$ is the number of incidents m weeks (or days) ago, $x_{t-m}$ is the number of deployments made m days ago. The Granger test evaluates the possibility to predict the number of incidents $y_t$, by looking at the past and current values of the number of incidents $x_t$ and the number of deployments $y_t$. The null hypothesis of the test is set as "the number of deployments is not the cause of the number of incidents." The null hypothesis is rejected if the probability that the null hypothesis is true, i.e., the p-value, is less than 0.05. Causality is established if there is enough evidence to reject the null hypothesis. Hence, when the p-value is small enough it is assumed that the number of deployments is a Granger-cause of the number of incidents. In other words, the number of incidents can be predicted from the number of past and current deployments. According to an exemplary embodiment, the causality test is run for every team's deployment data separately. In that case, each individual test indicates if the corresponding team is the cause of any incidents. That way, the results of the test can be tied back to a specific team.

The present techniques are further described by way of reference to the following non-limiting example:

Two types of data were collected in a DevOps environment. The first was the number of weekly deployments. The second was the number of incidents reported by the information technologies (IT) operations during the same observation period. While a weekly period of observation was used in this example, the same test could be run using daily deployment numbers without loss of generality. Let X denote the array of number of deployments during the first N weeks, and let Y denote the array of number of incidents during the same period.

$$X = [x_1, x_2, \ldots, x_N], \quad Y = [y_1, y_2, \ldots, y_N]$$

In this particular example, data collected between June and January was used. The causality was tested for three time intervals. The first was June-October, the second was August-December and the third was the October-January time intervals. In order to have enough data for the causality test, about 20 weeks of data were included in each case. X(n) and Y(n) are plotted in FIGS. 2 and 3, respectively, between the weeks of Jun. 9, 2014 and Jan. 9, 2015.

The time series X and Y for the periods to be tested are given as follows:

June 2014-October 2014:
$X_{June-October}$=[0,0,0,1,2,6,7,10,23,19,20,16,11,35,34,49,44, 30,35,58,23], for n=1 . . . 21
$Y_{June-October}$=[0,3,2,1,1,2,2,2,2,0,3,3,5,2,2,1,1,1,2,2,4], for n=1, . . . 21

August 2014-December 2014:
$X_{August-December}$=[23,19,20,16,11,35,34,49,44,30,35,58,28, 44,26,53,24,47,40,60,4,2]
$Y_{August-December}$=[2,0,3,3,5,2,2,1,1,1,2,2,4,3,3,2,2,2,3,3,2]

October 2014-January 2015
$X_{October-January}$(n)=[49,44,30,35,58,28,44,26,53,24,47,40, 60,4,2,55,34,37]
$Y_{October-January}$(n)=[1,1,1,2,2,4,3,3,2,2,2,3,2,3,2,0,4,0]

Granger Causality Test Results—

The regression model for the Granger causality is Y=ƒ(X) to test if the change request deployments are the cause of incidents (i.e., of the incident reports). In order to test if the incidents are the cause of deployments, X=ƒ(Y) is used as the regression model. The function ƒ exists for Y=ƒ(X) if λ is Granger cause of Y. Here Y is the weekly number of incidents (incident reports) and X is the weekly number of deployments (deployed change requests). Here the test is run for each individual team's deployment data against the incident reports to be able to link the results of the test back to a particular team. The test was performed with a lag value of 1, with the assumption that the deployments over the present week and the week before cause the incidents of the current week (which means that only the deployments of a team that have happened since the last week are the likely cause of the incidents and deployments prior to that do not have any impact on the incident data). The p-value found for each time period is provided in table 400 of FIG. 4.

Figure 4:
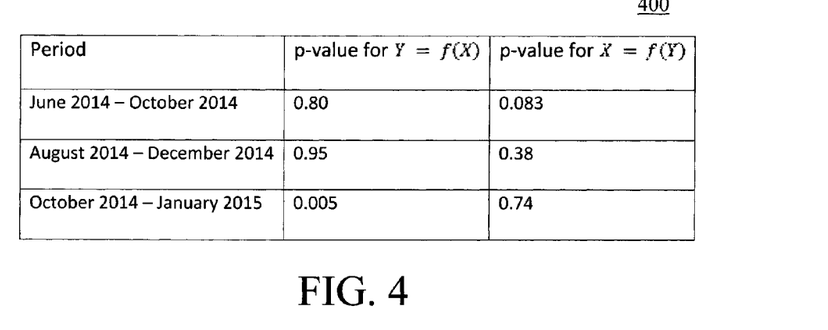
FIG. 4 is a table of exemplary p-values for the Granger causality test for three different periods according to an embodiment of the present invention.

Table 400 indicates that deployments are the cause of incidents in October 2014-January 2015 period when the p-value is less than 0.05. For other periods, there is not enough evidence to reject the null hypothesis that there is no causality. There is also no evidence that at any point in time incidents were the cause of deployments, i.e., function ƒ exists for Y=ƒ(X).

Figure 5:
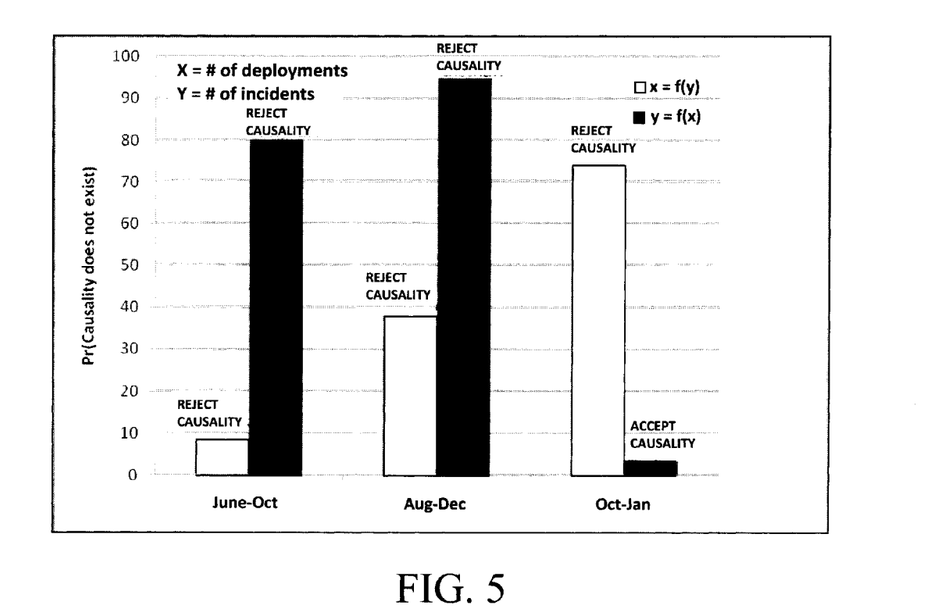
FIG. 5 is a diagram illustrating the probability that the null hypothesis is true, the p-value, for the three different periods according to an embodiment of the present invention.

FIG. 5 shows that performance of the developers had a negative impact during the October-January time period. Namely, the Granger causality test shows that the deployments done during this period caused incidents. This is an indication that for some reason the code delivered during this period caused incidents after being deployed. As expected, FIG. 5 also shows that incidents do not cause deployments.

Alert Generation—

The time window to test the causality between deployments and incidents can be slid every week to determine when the deployments start causing the incidents. In this example, data was collected on the number of deployments and number of incidents every week. About 10 data points are needed to run the test, so the data that are collected for the last 10 weeks was used. Since it is not known exactly which week the deployments started causing incidents, the periods for which the data is analyzed are overlapped. For example, the test was run for the data that was collected between June and October. Then the start point of the analysis was moved to August. This way, the possibility can be taken into account that some of the deployments in August may cause incidents after October, and so on. The selection of the duration of the overlapping periods is left to the release/project manager. For instance, in FIG. 6 (described below), the starting point for the analyses is shifted one week every time to get weekly results for causality. In that case, all weeks overlap except the first and the last week. When the most recent data is added, the oldest data is dropped from the array of number of weekly deployments and incidents. The new p-value is computed every time the new data is added. Below are the arrays for the number of deployments and incidents for N consecutive weeks sliding every week with the new data:

Week 1: $X(N)=[x_1, \ldots, x_N]$, $Y(N)=[y_1, y_2, \ldots, y_N]$, Granger causality test p-value=$p_1$ Week 2: $X(N+1)=[x_2, \ldots, x_{N+1}]$, $Y(N+1)=[y_2, \ldots, y_{N+1}]$, Granger causality test p-value=$p_2$

. . .

Week m: $X(N+m)=[x_1, x_2, \ldots, x_{N+m}]$, $Y(N)=[y_1, y_2, \ldots, y_{N+m}]$, Granger causality test p-value=$p_m$.

Figure 6:
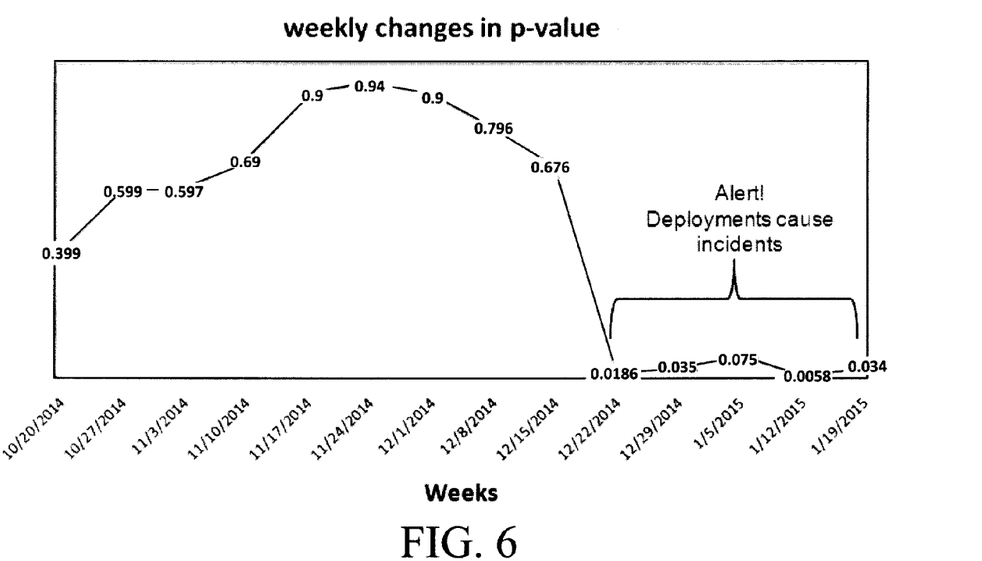
FIG. 6 is a diagram illustrating a weekly trend of the p-values according to an embodiment of the present invention.

Assuming the data is gathered weekly, the trend of p-value in time shows how causality changes. As the p-value drops below 0.05, the development team is alerted as the potential cause of incidents. FIG. 6 represents the weekly p-value trend. The p-value drops below 0.005 starting from the week of Dec. 22, 2014 until Jan. 19, 2015. There is enough evidence on that week that deployments are causing incidents. An alert should be issued to the development team about the possibility that their code refreshes may be causing some system failures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
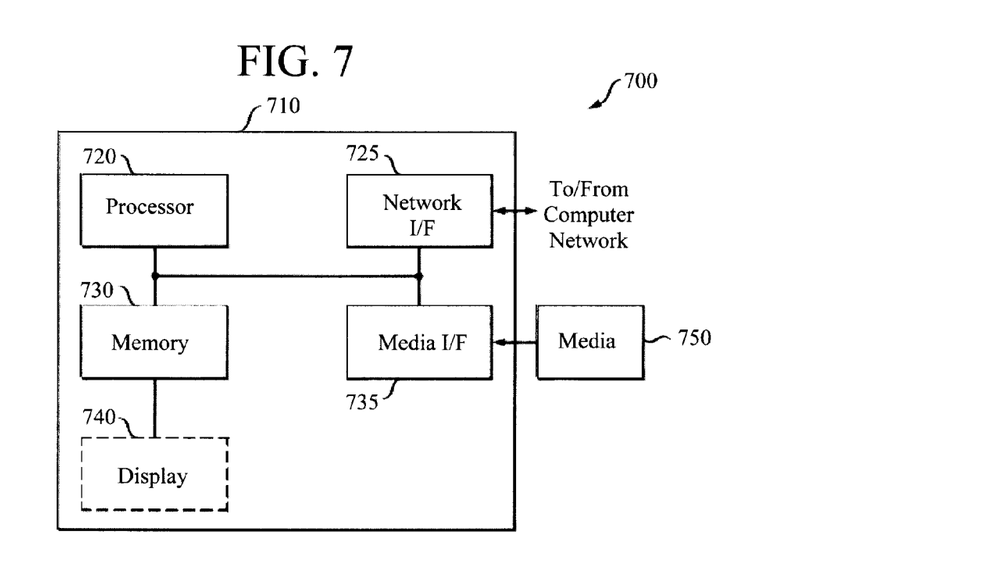
FIG. 7 is a diagram illustrating an exemplary apparatus for performing one or more of the methodologies presented herein according to an embodiment of the present invention.

Turning now to FIG. 7, a block diagram is shown of an apparatus 700 for implementing one or more of the methodologies presented herein. By way of example only, apparatus 700 can be configured to implement one or more of the steps of methodology 100 of FIG. 1.

Apparatus 700 includes a computer system 710 and removable media 750. Computer system 710 includes a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for identifying software development teams causing operation incidents when changing and deploying code, the method comprising the steps of:

collecting data regarding i) a number of deployed change requests for each of the software development teams and ii) a total number of incident reports created for all of the software development teams;

generating a time series for the number of deployed change requests for each of the software development teams;

generating a time series for the total number of incident reports created;

performing causality testing between the time series for the number of deployed change requests for each of the software development teams and the time series for the total number of incident reports created; and automatically identifying particular software development teams causing the operation incidents when changing and deploying code using only the number of deployed change requests for each of the software development teams and the total number of incident reports created, irrespective of a content of the incident reports, by determining whether the total number of incident reports created can be expressed in terms of the number of deployed change requests for any of the software development teams.

2. The method of claim 1, further comprising the step of: choosing an observation period.

3. The method of claim 2, wherein the observation period is a day, a week, or a month.

4. The method of claim 2, wherein the determining step comprises the step of:

determining whether the total number of incident reports created for the observation period can be expressed in terms of the number of deployed change requests for any of the software development teams.

5. The method of claim 1, wherein the causality testing is performed using a Granger causality test.

6. The method of claim 1, further comprising the step of: assuming causality exists if the total number of incident reports created can be expressed in terms of the number of deployed change requests for any of the software development teams.

7. The method of claim 6, further comprising the step of: assuming no causality exists if the total number of incident reports created cannot be expressed in terms of the number of deployed change requests for any of the software development teams.

8. The method of claim 6, further comprising the step of: sending an alert to each of the software development teams for which causality is assumed to exist.

9. The method of claim 1, further comprising the step of: repeating the collecting, generating, performing, and determining steps at a given predetermined interval.

10. A method for identifying software development teams causing operation incidents when changing and deploying code, the method comprising the steps of:

collecting data regarding i) a number of deployed change requests for each of the software development teams and ii) a total number of incident reports created for all of the software development teams;

generating a time series for the number of deployed change requests for each of the software development teams;

generating a time series for the total number of incident reports created;

performing Granger causality testing between the time series for the number of deployed change requests for each of the software development teams and the time series for the total number of incident reports created; and automatically identifying particular software development teams causing the operation incidents when changing and deploying code using only the number of deployed change requests for each of the software development teams and the total number of incident reports created, irrespective of a content of the incident reports, by determining whether the total number of incident reports created can be expressed in terms of the number of deployed change requests for any of the software development teams, wherein causality is assumed to exist if the total number of incident reports created can be expressed in terms of the number of deployed change requests for any of the software development teams, and wherein no causality is assumed to exist if the total number of incident reports created cannot be expressed in terms of the number of deployed change requests for any of the software development teams.

11. The method of claim 10, further comprising the step of:

choosing an observation period.

12. The method of claim 11, wherein the observation period is a day, a week, or a month.

13. The method of claim 11, wherein the determining step comprises the step of:

determining whether the total number of incident reports created for the observation period can be expressed in terms of the number of deployed change requests for any of the software development teams.

14. The method of claim 10, further comprising the step of:

sending an alert to each of the software teams for which causality is assumed to exist.

15. The method of claim 10, further comprising the step of:

repeating the choosing, collecting, generating, performing, and determining steps at a given predetermined interval.

* * * * *